(12) United States Patent
Alman (10) Patent No.: US 11,320,064 B2
(45) Date of Patent: May 3, 2022

(54) VALVE CAGE

(71) Applicant: FISHER CONTROLS INTERNATIONAL LLC, Marshalltown, IA (US)

(72) Inventor: Paul T. Alman, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 35 days.

(21) Appl. No.: 16/893,072

(22) Filed: Jun. 4, 2020

(65) Prior Publication Data

US 2021/0278005 A1 Sep. 9, 2021

Related U.S. Application Data

(60) Provisional application No. 62/985,153, filed on Mar. 4, 2020.

(51) Int. Cl.
*F16K 15/00* (2006.01)
*F16K 47/08* (2006.01)
*F16K 27/04* (2006.01)
*F16K 27/00* (2006.01)

(52) U.S. Cl.
CPC .......... *F16K 47/08* (2013.01); *F16K 27/003* (2013.01); *F16K 27/04* (2013.01)

(58) Field of Classification Search
CPC .......... F16K 3/265; F16K 27/04; F16K 47/08; F16K 47/12; F16K 47/16; Y10T 137/86734
See application file for complete search history.

(56) References Cited

U.S. PATENT DOCUMENTS

| 5,803,119 A * | 9/1998 | Steinke | F16K 47/04 |
| | | | 137/625.37 |
| 2009/0033090 A1* | 2/2009 | Stoll | F16L 37/0915 |
| | | | 285/317 |
| 2018/0128294 A1* | 5/2018 | Sundararajan | F16K 47/08 |
| 2018/0340616 A1* | 11/2018 | McCarty | B23P 15/001 |

FOREIGN PATENT DOCUMENTS

WO WO-2018025281 A1 * 2/2018 ............... F16K 3/24

* cited by examiner

*Primary Examiner* — Reinaldo Sanchez-Medina
(74) *Attorney, Agent, or Firm* — Marshall, Gerstein & Borun LLP (57) ABSTRACT

A flow control valve includes a valve body having an inlet, an outlet, and a flow path connecting the inlet and the outlet. A trim assembly is disposed in the flow path and includes a valve seat and a cage. The cage includes a body and a central cavity defined by the body. A control member is movable in the central cavity of the cage between an open position, in which the control member is spaced away from the valve seat, and a closed position, in which the control member engages the valve seat. The body has a non-circular longitudinal cross-section.

19 Claims, 9 Drawing Sheets

VALVE CAGE

FIELD OF DISCLOSURE

The present disclosure relates to a control valve, and in particular, a valve cage for a control valve.

BACKGROUND

Control valves are commonly used in process plants to control the flow of a fluid (e.g., a gas, a liquid, etc.) or any other substance through pipes and/or vessels to which they are connected. A control valve is typically composed of one or more inlets and outlets, and includes a fluid control element or member (e.g., a valve gate, a piston, a valve plug, a control member, etc.) that operates to control fluid flow through apertures that fluidly couple the inlet(s) to the outlet(s). A control member is typically coupled to a valve bonnet that is mechanically coupled (e.g., bolted, clamped, threaded into, etc.) to the valve body. Typically, the control member is configured to engage a sealing structure (e.g., a valve seat) that encompasses a flow path through the valve. A regulator is a self-controlling form of a control valve.

Generally speaking the control elements (e.g., the fluid control member, the seat, and a cage) are known as "valve trim" or "trim assembly" in the art. In some cases it may be desirable to characterize fluid as it flows through the valve, for example, to reduce pressure. In these cases, a trim assembly may be used that includes a cage with a plurality of openings that are drilled, cast, punched, machined etc., through a wall of the cage. The openings may be sized and shaped to characterize fluid flow as the fluid flows through the openings in the cage, for example by decreasing pressure as the fluid moves through the valve trim. This characterization or pressure reducing process generates unwanted noise.

Hydrodynamic noise, for example, may be caused by cavitation, which is the formation and collapse of vapor cavities of a flow stream subject to rapid pressure changes. When the vapor cavities in the fluid are subject to higher pressure, the vapor cavities implode and can generate an intense shock wave that can damage internal portions of the valve or produce audible noise. Damage from cavitation can happen gradually, and if discovered early enough, valve parts can be replaced to avoid leaks and/or valve failure. Currently, cavitation is controlled by using pressure drops and sound reduction is done by cages having a plurality of holes drilled, cast, punched, machined, etc., into a cage wall.

SUMMARY

In accordance with a first exemplary aspect, a flow control valve may include a valve body having an inlet, an outlet, and a flow path connecting the inlet and the outlet. A trim assembly may be disposed in the flow path and may include a valve seat and a cage. The cage may include a body and a central cavity defined by the body of the cage. A control member may be movable in the central cavity of the cage between an open position, in which the control member is spaced away from the valve seat, and a closed position, in which the control member engages the valve seat. The body of the cage may have a non-circular longitudinal cross-section.

In accordance with a second exemplary aspect, a cage assembly may include a control member and a cage. The cage may include a central cavity and a body defining the central cavity. The body of the cage may have a non-circular longitudinal cross-section. The central cavity of the cage may slidably receive the control member.

In accordance with a third exemplary aspect, a cage for a fluid control device may include a body having an interior wall and an exterior wall. A central cavity may be defined by the interior wall of the body. A plurality of flow paths may connect the interior wall and the exterior wall of the body. The plurality of flow paths may be tangentially disposed relative to the central cavity. The body of the cage may have a non-circular longitudinal cross-section.

In further accordance with any one or more of the foregoing first, second, and third exemplary aspects, a fluid control valve, a cage assembly, and/or a valve cage may include any one or more of the following forms.

In a preferred form, the body of the cage may include a plurality of projections extending radially outward from the central cavity.

In a preferred form, a plurality of flow paths may be formed in one or more of the plurality of projections of the body of the cage.

In a preferred form, the plurality of flow paths may extend between an inner wall and an outer wall of the body of the cage.

In a preferred form, the one or more of the plurality of flow paths may be oriented substantially tangential to a central cavity.

In a preferred form, each projection of the plurality of projections may have a U-shape cross-section with first and second arms and an elbow connecting the first and second arms.

In a preferred form, a plurality of flow paths may be formed in at least one of the first and second arms of each projection of the plurality of projections.

In a preferred form, a peripheral cavity may be disposed radially outward relative to the central cavity.

In a preferred form, the peripheral cavity may be in fluid communication with the central cavity.

In a preferred form, a baffle may be disposed in the peripheral cavity.

In a preferred form, the control member may include a rib extending into the peripheral cavity.

In a preferred form, the body of the cage may include a plurality of lobes adjacent the central cavity of the cage.

In a preferred form, a plurality of flow paths may extend through one or more lobes of the plurality of lobes.

In a preferred form, the plurality of flow paths may be tangentially oriented relative to the central cavity.

In a preferred form, a plurality of peripheral cavities may be in fluid communication with the central cavity.

In a preferred form, each peripheral cavity of the plurality of peripheral cavities may be defined by one lobe of the plurality of lobes.

In a preferred form, the control member may include a plurality of ribs.

In a preferred form, each rib of the plurality of ribs may extend into one peripheral cavity of the plurality of peripheral cavities.

In a preferred form, a baffle may be disposed in at least one peripheral cavity of the plurality of peripheral cavities.

In a preferred form, each lobe of the plurality of lobes may have a U-shaped longitudinal cross-section.

In a preferred form, the U-shaped longitudinal cross-section may include a first arm, a second arm, and an elbow connecting the first and second arms.

In a preferred form, a plurality of flow paths may be disposed in at least one of the first and second arms of the plurality of lobes.

In a preferred form, the body may include a plurality of projections extending outwardly from the central cavity.

In a preferred form, at least one of the plurality of projections may define a peripheral cavity that is fluidly connected to the central cavity.

In a preferred form, each projection of the plurality of projections may include a U-shaped longitudinal cross-section including a first arm, a second arm, and an elbow connecting the first and second arms.

In a preferred form, the plurality of flow paths may be formed in the first and second arms of each projection.

DETAILED DESCRIPTION

Figure 1:
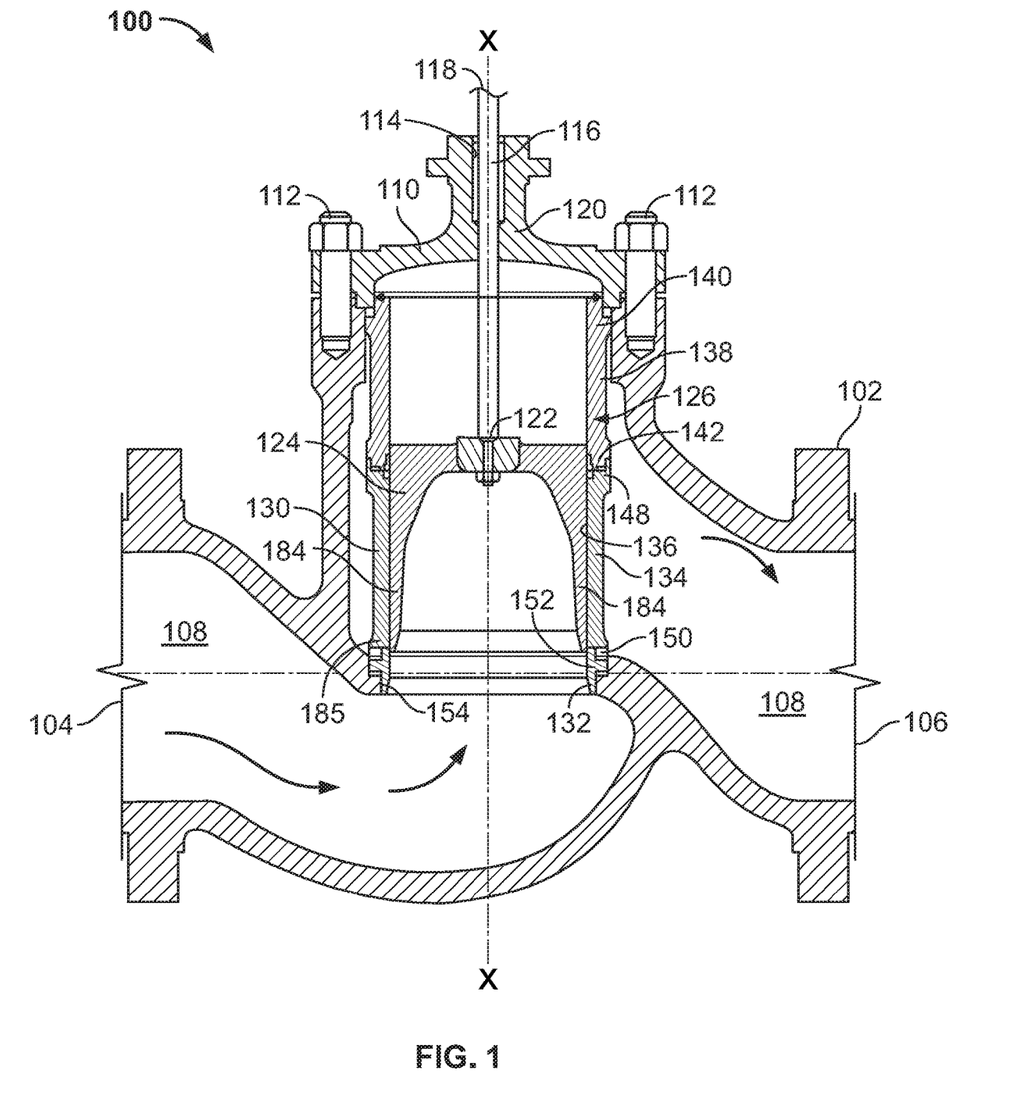
FIG. 1 is a cross-sectional view of an exemplary control valve and a first exemplary valve cage assembled in accordance with the teachings of the present disclosure.

The exemplary valve cages described herein may substantially reduce the impact of cavitation, thereby extending the useful life of valve components of a control valve or regulator. Turning first to FIG. 1, a first exemplary fluid valve 100 is constructed in accordance with the teachings of the present disclosure. The valve 100 has a valve body 102 having an inlet 104, an outlet 106, and a fluid flow path or passageway 108 connecting the inlet 104 and the outlet 106. A bonnet 110 is coupled to the valve body 102 via a plurality of fasteners 112 and includes a bore 114 to receive a stem 116. An end 118 of the stem 116 extends from a bonnet body 120 and is operatively coupled to an actuator (not shown), and an opposite end 122 of the stem 116 is coupled to a control member 124 (e.g., a valve plug).

A valve trim assembly 126 of the first exemplary fluid valve 100 includes a cage 130 and a seat ring 132 defining a valve seat. The cage 130 includes a body 134 and a central cavity 136 defined by the body 134. In the example illustrated in FIG. 1, the valve trim assembly 126 includes a cage retainer 138 that is separate and distinct from the cage 130. However, in other examples, the cage 130 and the cage retainer 138 may be formed as a single unitary structural element. The valve trim assembly 126 is disposed in the flow path and interacts with the control member 124 to control the flow of fluid through the valve body 102. The control member 124 is movable in the central cavity 136 of the cage 130 between an open position, in which the control member 124 is spaced away from the valve seat 132, and a closed position, in which the control member 124 engages the valve seat 132. In FIG. 1, the valve 100 is shown in the closed position.

Generally, an end 140 of the cage retainer 138 is positioned at least partially within the valve body 102 and adjacent the bonnet 110, and an opposing end 142 of the cage retainer 138 engages a first end 148 of the cage 130 such that the cage retainer 138 and the cage 130 are coaxially aligned. The cage 130 is positioned within the valve body 102 such that opposing steps or shoulders 150 and 152 of the cage 130 and the seat 132 (e.g., a seat ring) engage and/or interlock to secure the seat 132 at least partially within an aperture 154 of the valve body 102. In other examples, the cage 130 be installed in a valve without a cage retainer 138 and/or with an integrally formed cage retainer.

The control valve 100 of FIG. 1 is a flow-up control valve where fluid flows into the control valve 100 through the inlet 104, flows through the cage 130 from the central cavity 136 to the outside of the cage 130, and exits the control valve 100 through the outlet 106. In other examples, the valve 100 can be a different type of control valve, such as, for example, a flow-down valve, a rotary control valve (e.g., a Fisher® Vee-Ball™ V150 valve, a Fisher® Vee-Ball™ V300 valve, etc.), a throttle valve, an isolation valve, or other control valve. Moreover, the components of the control valve 100 (e.g., the valve body 102, the control member 124, and the bonnet 110) can vary from what is depicted herein. For example, the inlet 104, the outlet 106, and the fluid flow path 108 extending therebetween can vary in shape and/or size and yet still perform the intended functionality.

Figure 2:
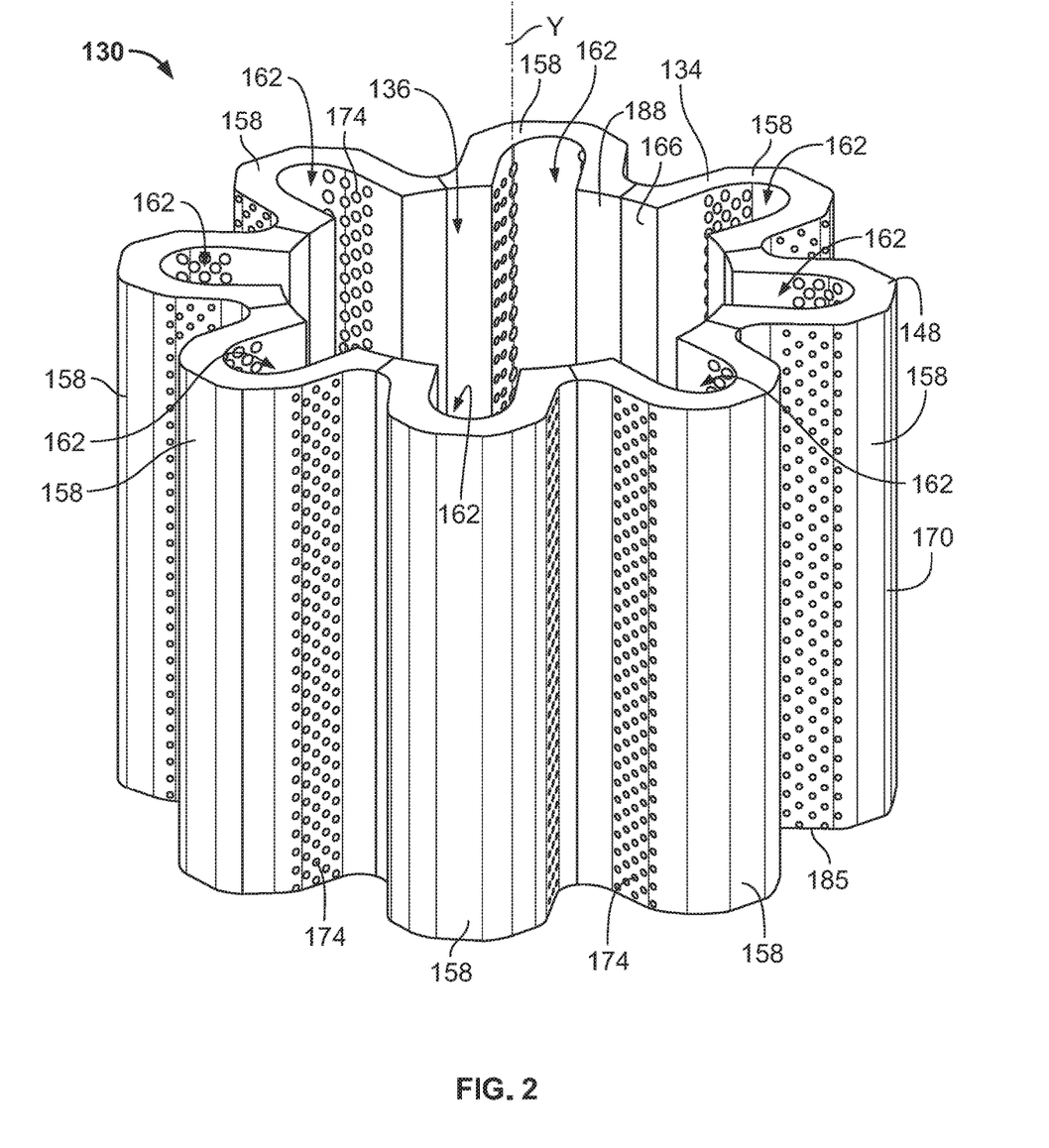
FIG. 2 is a perspective view of the first exemplary valve cage of FIG. 1.
Figure 3:
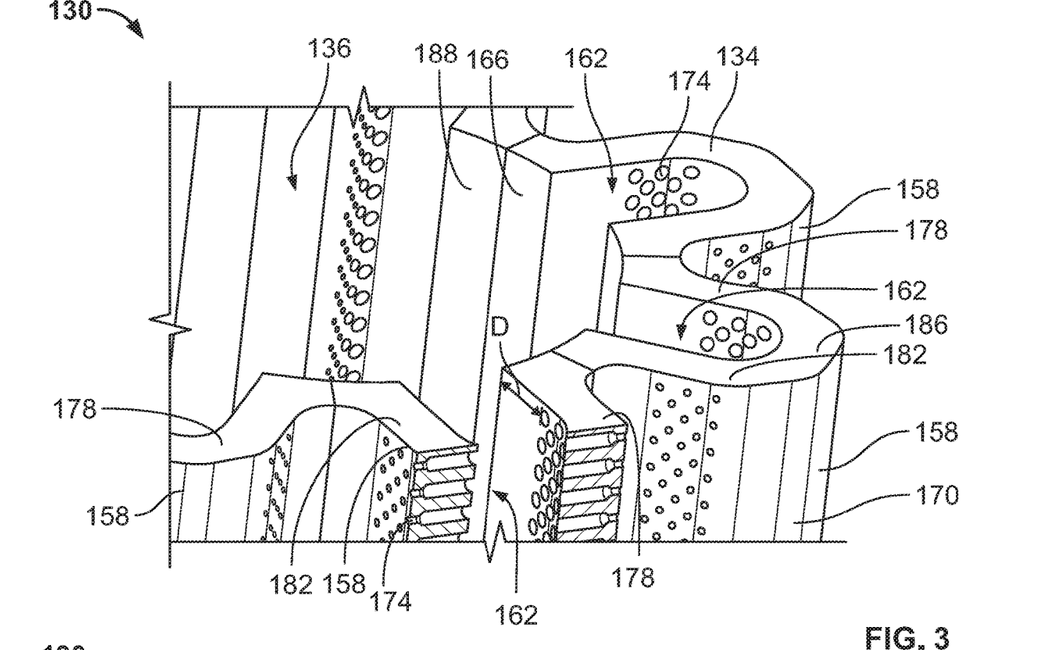
FIG. 3 is a cross-sectional, perspective view of the valve cage of FIG. 1.
Figure 4:
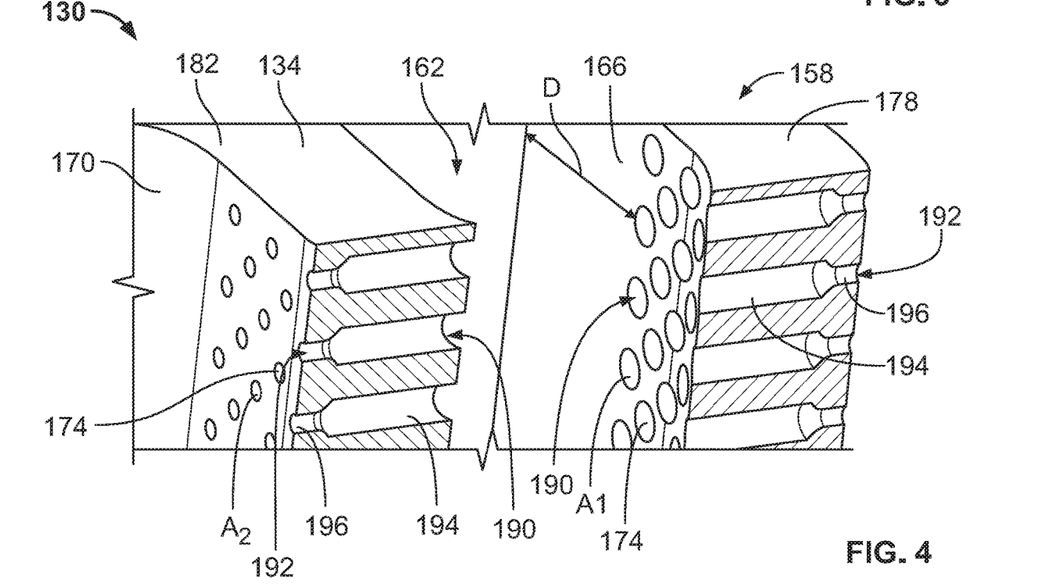
FIG. 4 is a magnified view of the cross-sectional, perspective view of the valve cage of FIG. 3.

While existing valve cages have circular cross-sections, the first exemplary cage 130 of FIGS. 2-4 described herein has a non-circular longitudinal cross-section. The walled body 134 of the cage 130 has a plurality of projections 158, or lobes 158, extending radially outward from the central cavity 136, to form a non-circular longitudinal cross-section. In this example, the cage 130 has eight, evenly spaced projections 158 and each projection 158 defines a peripheral cavity 162 that is in fluid communication with the central cavity 136. The peripheral cavities 162 are peripherally located relative to the central cavity 136 and receive fluid flow travelling through the central cavity 136 before exiting the cage 130. The cage body 134 includes an interior wall 166 and an exterior wall 170, wherein the interior wall 166 at least partially defines the central 136 and peripheral cavities 162 of the cage 130.

As shown in FIGS. 3 and 4, a plurality of flow paths 174 extend between the interior wall 166 and the exterior wall 170 of the cage body 134 to fluidly connect the central cavity 136 of the cage 130 with an external environment of the cage 130. In particular, the flow paths 174 extend through each projection 158 of the cage body 134. Each projection 158 has a U-shaped longitudinal cross-section having a first arm 178, a second arm 182, and an elbow 186 connecting the first and second arms 178, 182. The first and second arms 178, 182 of the U-shape extend radially outwardly from a cylindrical bore 188 of the body 134 and connect with second and first arms 182, 178, respectively, of adjacent projections 158. The projections 158 are spaced from each other to provide a daisy-shape cross-section, with exterior spaces in between the projections 158 and the exterior wall 170 of the cage body 134. In these spaces, fluid jets impact each other to dissipate energy. To create the impact of fluid on the exterior of the cage 130, the flow paths 174 are formed in at least one of first and second arms 178, 182 of each projection 158. In the illustrated example, flow paths 174 are formed in each arm 178, 182 of every projection 158 and extend the length (i.e., from a first end 148 of the cage to a second end 185) of the cage 130. In other examples, each projection may have a different cross-sectional shape, flow path arrangement, and orientation than what is illustrated. While the arrangement of the projections 158 form a symmetrical longitudinal cross-section of the cage 130, in other examples, the projections may be arranged to form an asymmetrical cross-section of the cage 130.

Returning briefly to FIG. 1, the illustration of the control valve 100 depicts a cross-section of two projections 158 of the cage 130 and the control member 124 slidably disposed in the cage 130. In this example, the control member 124 has a plurality of ribs 184 extending radially outward relative to a central axis X of the control member 124. Each rib 184 of the plurality of ribs 184 extends into a peripheral cavity 162 of one of the projections 158. As shown in FIG. 1, the ribs 184 of the control member 124 abut the interior wall 166 of the projections 158. So configured, throttling of fluid through the cage 130 would occur directly at the openings of each of the plurality of flow paths 174. In particular, the openings of the flow paths 174 are blocked by the ribs 184 of the plug 124 until the entire plug 124 moves away from the valve seat 132 (i.e., moves upwards in the orientation of FIG. 1) to expose the flow paths 174 to the control fluid. A first pressure drop occurs at this point as it is the smallest section of the controlled flow cross section area, and is where the fluid control or throttling occurs. The fluid pressure drop may be more accurately controlled to alleviate cavitation. The control member 124 may be manufactured specifically to fit within the central and peripheral cavities of the cage 130, and therefore a cage assembly, which includes both the cage 130 and the control member 124, may be manufactured, packaged, and sold together.

Turning back to FIGS. 3 and 4, a lateral cross-section of one of the projections 158 is shown in more detail. The plurality of flow paths 174 are formed in each arm 178, 182 of the projection 158, and run the length (i.e., from the first end 148 to the second end 185) of the cage 130. The plurality of flow paths 174 are radially spaced a distance D from the cylindrical bore 188 of the cage 130 and stop at the curve of the connecting elbow 186. Each of the flow paths 174 has an opening at an inlet 190 with a cross-sectional area A1 that is larger than an opening of an outlet 192, which has a cross-sectional area A2. The inlet 190 of the flow path 174 is connected to an inlet passage 194 and the outlet 192 is connected to an outlet passage 196 which is more narrow than the inlet passage 194 to create a pressure drop or a pressure reduction stage. The flow paths 174 formed in the projections 158 are substantially tangentially oriented relative to the cylindrical bore 188 of the cage 130 such that fluid jets impact each other when exiting the cage 130.

The inlet passages 194 are positioned adjacent the interior wall 166 and extend into the first and second arms 178, 182 of the cage body 134. In the example shown, the inlet passages 194 are cylindrical, but can be any shape desired for a particular application. The inlet passages 194 are radially and longitudinally offset from other inlet passages 194 such that none of the inlet passages 194 of the flow paths 174 intersect. The inlet passages 194 have a larger cross-sectional area A1 than the cross-sectional area A2 of the outlet passages 196 to provide a first pressure drop as fluid flows between the inlet passages 194 and outlet passages 196. Outlet passages 196 are positioned adjacent the exterior wall 170 and extend into the first and second arms 178, 182 of the cage body 134. In the example shown, the outlet passages 196 are cylindrical, but may be any shape desired for a particular application. The outlet passages 196 are radially and longitudinally offset from each other such that none of the inlet passages 194 of the flow paths 174 intersect. The flow of fluid from the outlet passages 196 to an area outside of the cage 130 provides another pressure drop for fluid flow. In some examples, one or more intermediate passages may connect each inlet passage 194 and outlet passage 196 to provide one or more pressure drops.

Figure 5:
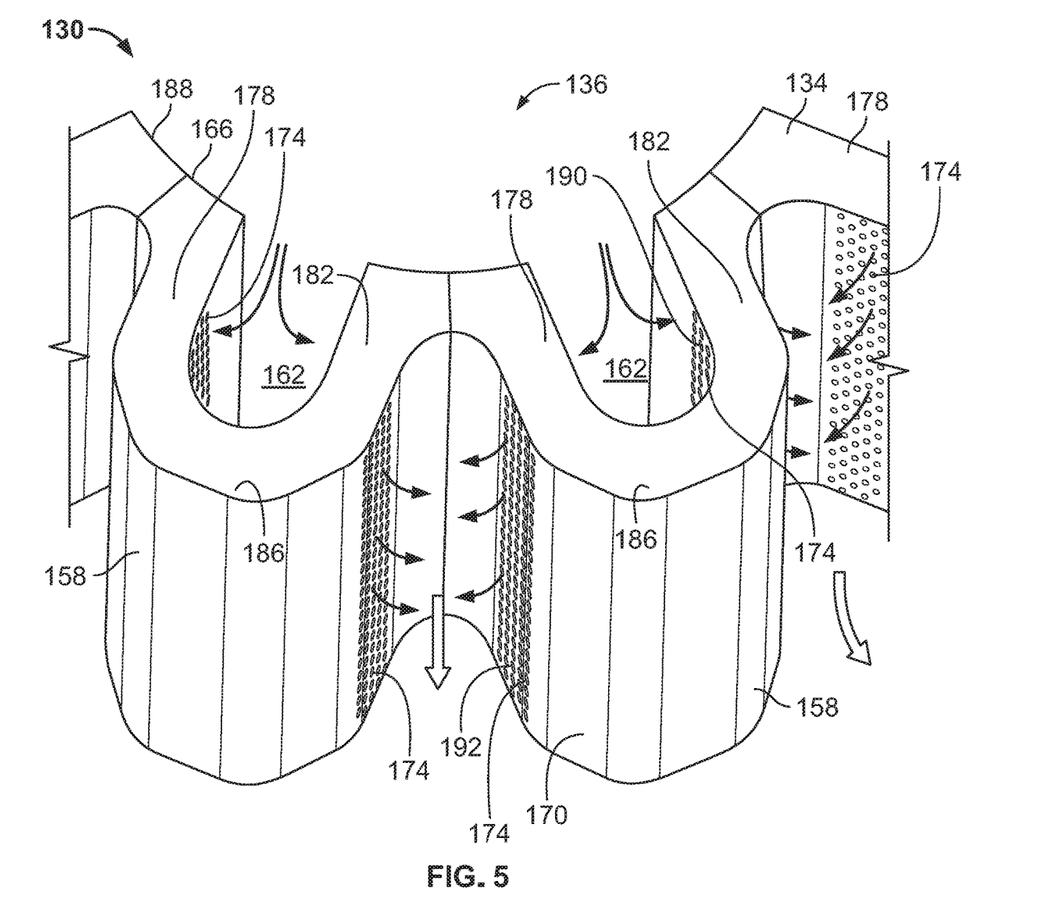
FIG. 5 is an exemplary flow diagram of fluid flow through the valve cage of FIG. 1.

So configured, and as shown in flow diagram of FIG. 5, fluid flowing through the valve body (e.g., the valve body 102 of FIG. 1) enters the central cavity 136 of the cage 130 and is directed to flow into the peripheral cavities 162 of the projections 158. Fluid exits the cage 130 by flowing through the plurality of flow paths 174 formed in the projections 158 and extending between the interior wall 166 and exterior wall 170 of the cage body 134. Specifically, fluid flows through the inlets 190 and into the inlet passages 194 of the flow paths 174 and through a first pressure reduction stage when passing into the outlet passages 196. Jets of fluid exit through the outlets 192 of the flow paths 174 and impact jets exiting from flow paths 174 of adjacent projections 158. As the jets of fluid collide into each other, energy from the jets dissipate upon impact, and any damage due to cavitation occurs at the exterior wall 170 of the cage 130 rather than an interior wall of the valve body.

In the illustrated example, each projection 158 has a plurality of flow paths 174 formed in the first and second arms 178, 182 of the cage body 134. However, in other examples, not all of the projections 158 have flow paths 174 formed in the first and second arms 178, 182. Further, other examples may have different patterns of flow paths 174 dispersed along the length of the cage (i.e., parallel to a longitudinal axis Y). In one example, the flow paths of the cage 130 may be concentrated in a lower portion and/or an upper portion of the cage 130. In another example, the flow paths may be formed differently so that the flow paths are more tortuous through the cage body 134. In yet another example, the flow paths may be formed in the elbow 186 of each projection 158.

Figure 6:
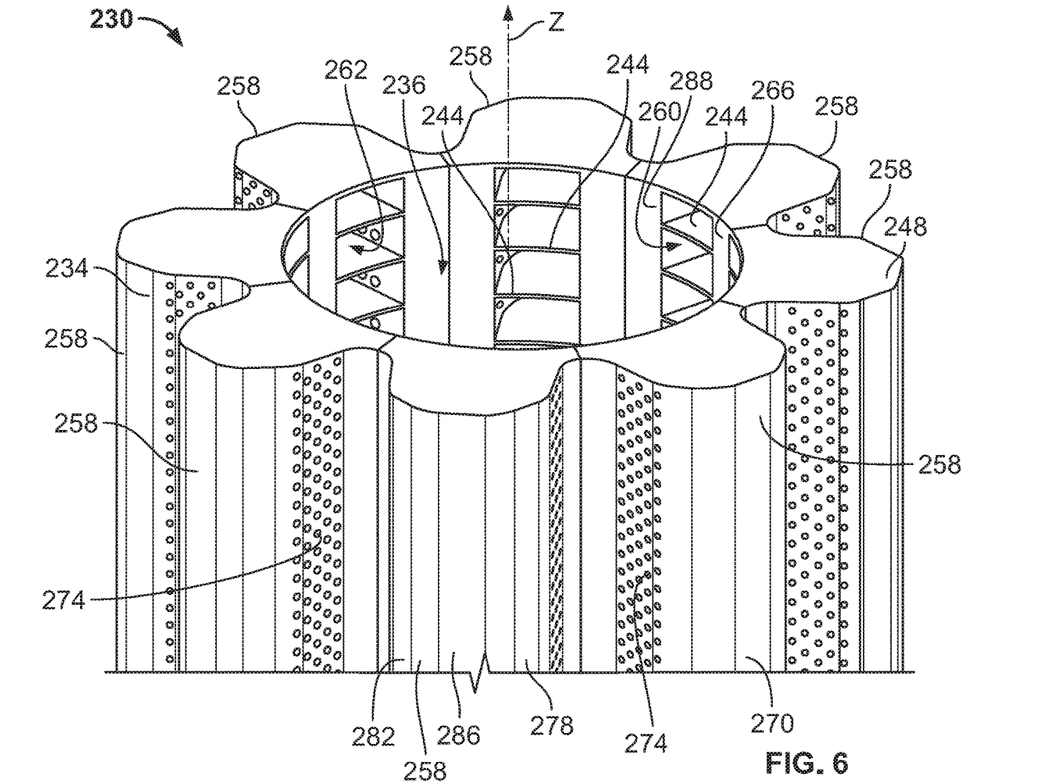
FIG. 6 is a perspective view of a second exemplary valve cage for a control valve assembled in accordance with the teachings of the present disclosure.
Figure 7:
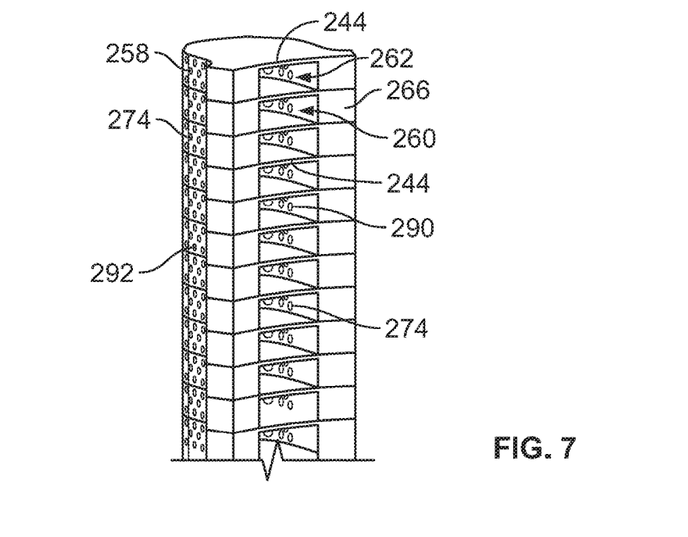
FIG. 7 is a perspective view of a portion of the valve cage of FIG. 6.

Turning now to FIGS. 6 and 7, a second exemplary valve cage 230 is constructed in accordance with the teachings of the present disclosure. The second exemplary valve cage 230 is similar to the first exemplary valve cage 130 and may be installed in the control valve 100 of FIG. 1. Thus, for ease of reference, and to the extent possible, the same or similar components of the second exemplary valve cage 230 will retain the same reference numbers as outlined above with respect to the first exemplary valve cage 130, although the reference numbers will be increased by 100. The second exemplary valve cage 230 differs from the first exemplary valve cage 130, however, by including a plurality of baffles 244 disposed in one or more projections 258.

In contrast to the ribbed control member 124 that may be slidably received by the first exemplary cage 130 of FIGS. 1-5, the second exemplary cage 230 is configured to slidably receive a cylindrical or rounded control member. The plurality of baffles 244 divides each one of a plurality of peripheral cavities 262 of the cage 230, and an interior wall 266 of the baffles 244 helps guide a control member along a longitudinal axis Z of the valve cage 230. The baffles 244 help limit and control the volume of the plenum (i.e., the area between the plug 124 and the flow paths 174) that feeds the outlets 192 of the flow paths 174. The plenum can act as a pressure drop and recovery volume that "stages" or splits the pressure drop so that the control fluid does not undergo an uncontrolled pressure drop that drops below the vapor pressure of the control fluid.

Figure 8:
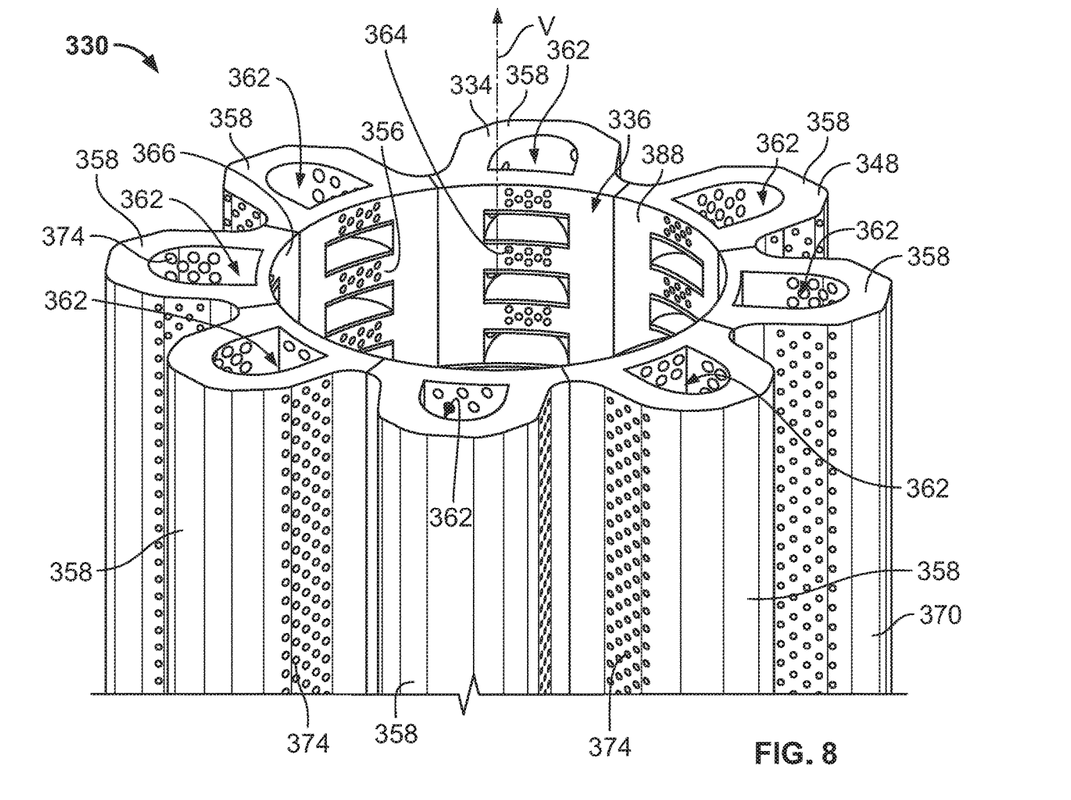
FIG. 8 is a perspective view of a third exemplary valve cage for a control valve assembled in accordance with the teachings of the present disclosure.
Figure 9:
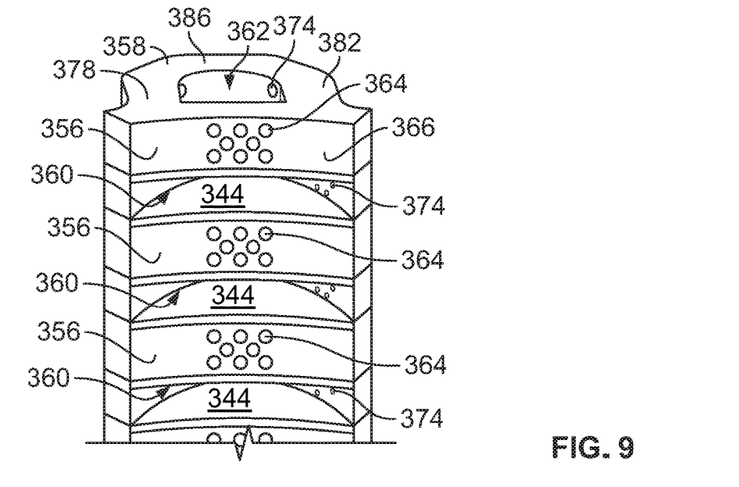
FIG. 9 is a perspective view of a portion of the valve cage of FIG. 8.
Figure 10:
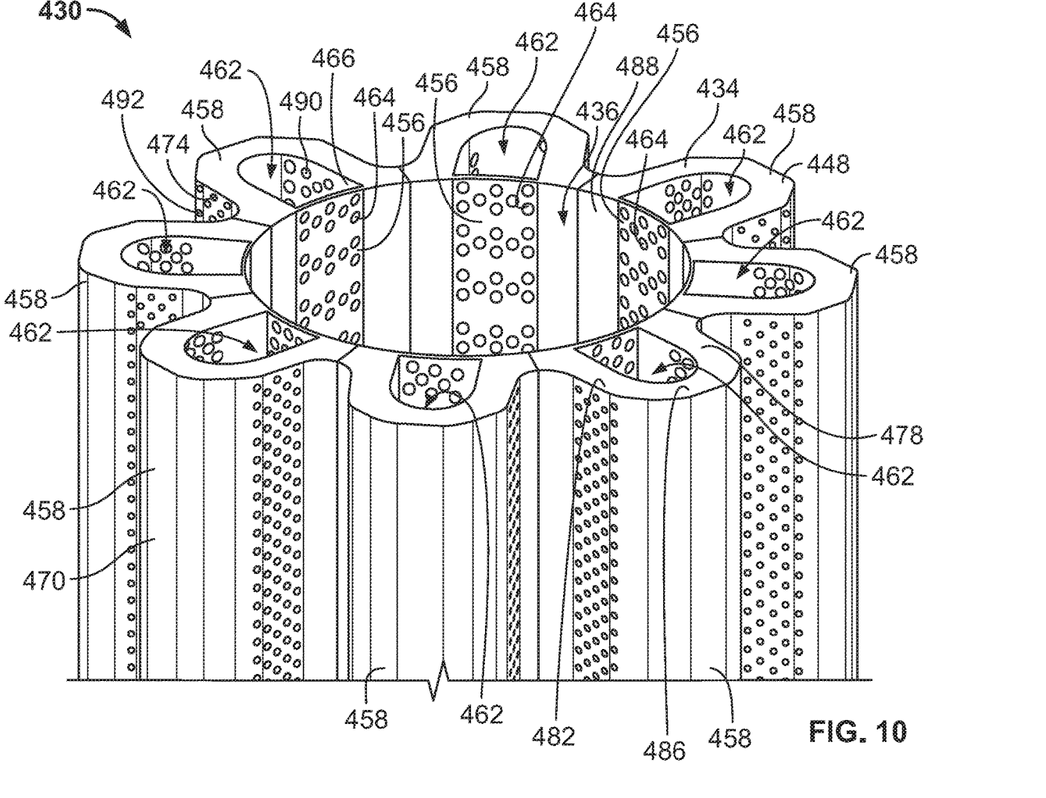
FIG. 10 is a perspective view of a fourth exemplary valve cage for a control valve assembled in accordance with the teachings of the present disclosure.

FIGS. 8 and 9 depict a third exemplary valve cage 330 and FIG. 10 depicts a fourth exemplary valve cage 530 that are constructed in accordance with the teachings of the present disclosure. The third and fourth exemplary valve cages 330, 430 are similar to the second exemplary valve cage 230 and each may be installed in the control valve 100 of FIG. 1. Thus, for ease of reference, and to the extent possible, the same or similar components of the third and fourth exemplary valve cages 330, 430 will retain the same reference numbers as outlined above with respect to the second exemplary valve cage 230, although the reference numbers will be increased by 100 and 200, respectively. However, the third and fourth exemplary valve cages 330, 430 differ from the second exemplary valve cage 230 by providing a plurality of walls or barriers 356, 456, respectively, between a central cavity 336, 436 and one or more of a plurality of projections 358, 458.

The third exemplary valve cage 330 mitigates the effects of cavitation by providing an additional pressure reduction stage. In addition to the pressure reduction stage formed in a plurality of flow paths 374 (discussed above in connection with FIGS. 4-6), a second pressure reduction stage is created by providing a barrier 356 between a central cavity 336 of the cage 330 and a peripheral cavity 362 of one of the projections 358. Each projection 358 of the cage 330 includes a plurality of barriers 356 extending parallel to a V axis of the cage 330, thereby enclosing multiple compartments 360 between the projection 358 (i.e., first arm 378, second arm 382, and elbow 386) and the baffles 344. Additional openings 364 are formed in the barriers 356 such that fluid flows from the central cavity 336, through the openings 364, and into a plenum area of the compartment 360. In the illustrated example, each projection 358 has multiple compartments 360 with some compartments 360 open to the central cavity 336 while others are walled off from the central cavity 336 by the barriers 356. However, in another example illustrated in FIG. 10, a plurality of barriers 456 extend a length of a cage 430 (i.e., a first end 348 to a second end 385 of the cage 330) thereby separating the central cavity 436 from a plurality of peripheral cavities 462. In this example, a plurality of projections 458 may not include dividing baffles to further compartmentalize the peripheral cavities 462. Alternatively, in another example, the plurality of projections 458 may include baffles defining several compartments along the length of the cage 430.

Figure 11:
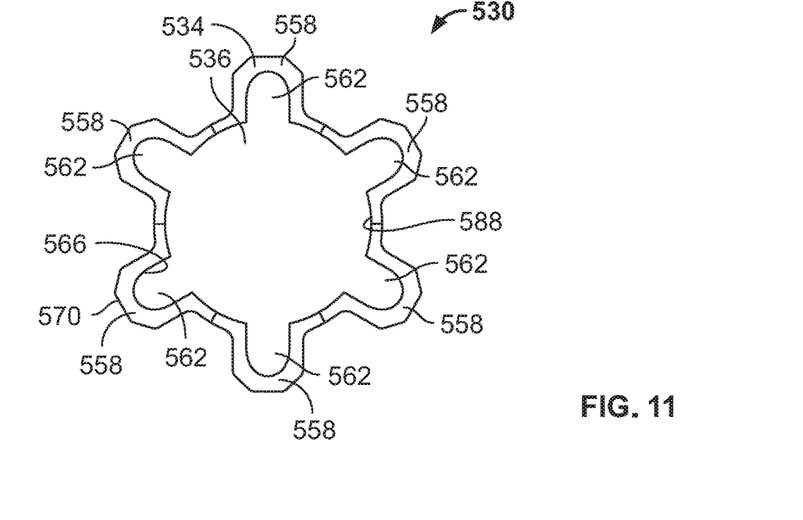
FIG. 11 is a top view of a fifth exemplary valve cage for a control valve assembled in accordance with the teachings of the present disclosure.

FIG. 11 is a fifth exemplary valve cage 530 constructed in accordance with the teachings of the present disclosure. The fifth exemplary valve cage 530 is similar to the first exemplary valve cage 130 and may be installed in the control valve 100 of FIG. 1. The same or similar components of the fifth exemplary valve cage 530 will retain the same reference but increased by 400. The fifth exemplary valve cage 530 differs from the previous exemplary cages 130, 230, 330, 430 by having six projections or lobes 558. However, any of the exemplary cages 130, 230, 330, 430, 530 may include fewer or more projections 158, 258, 358, 458, 558. The number, shape, and arrangement of projections 158, 258, 358, 458, 558 about the central cavity 136, 236, 336, 436, 536 of the cage 130, 230, 330, 430, 530 may depend on application, desired flow characteristics, and/or size of the control valve body in which the cage 130, 230, 330, 430, 530 is disposed.

Figure 12:
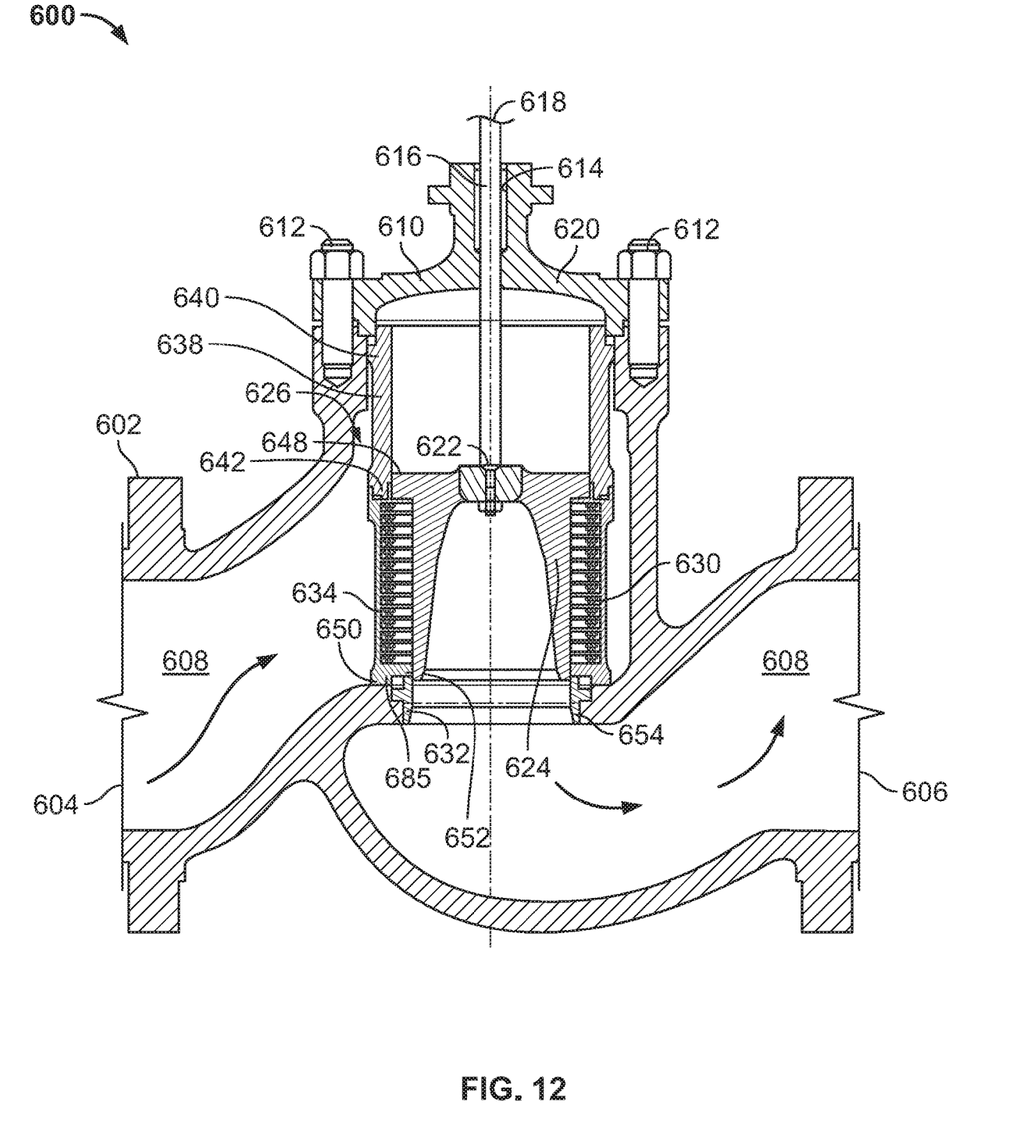
FIG. 12 is a cross-sectional view of a second exemplary control valve and a sixth exemplary valve cage assembled in accordance with the teachings of the present disclosure.
Figure 13:
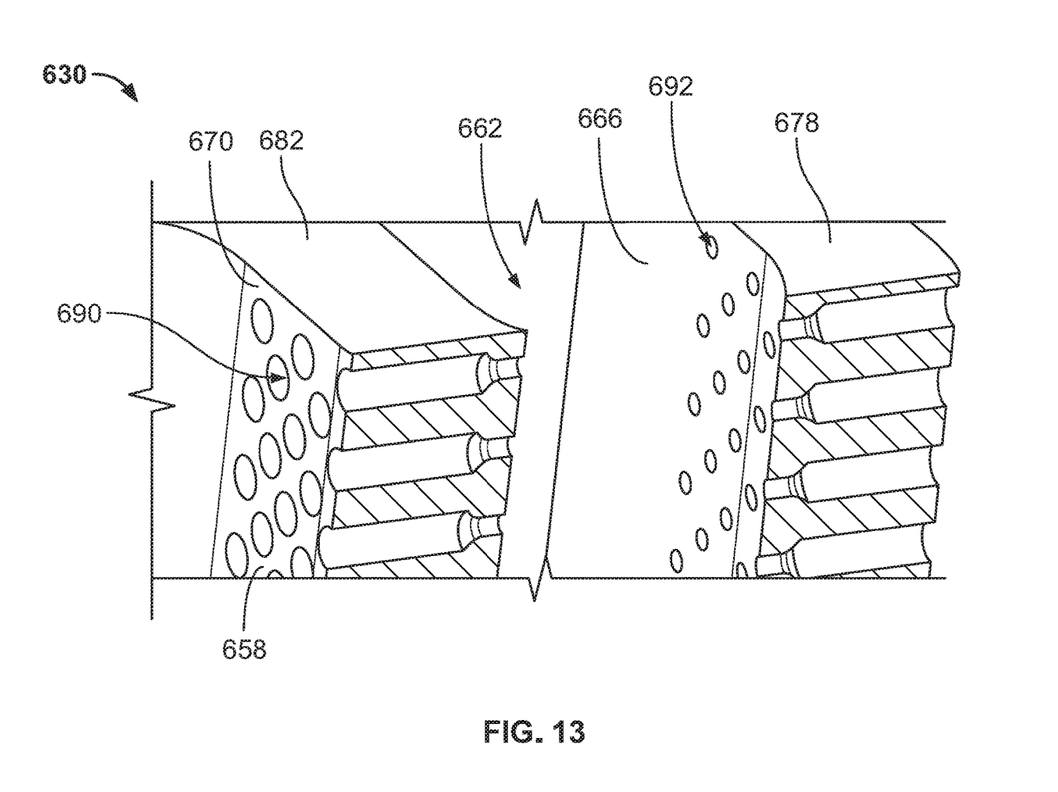
FIG. 13 is a magnified, cross-sectional view of the valve cage of FIG. 12.

In the illustrated examples, any of the exemplary cages 130, 230, 330, 430, 530 is configured for installation in a flow-up valve 100 where fluid flows through the cavity 136, 236, 336, 436, 536 of the cage 130, 230, 330, 430, 530 and through the plurality of pathways 174, 274, 374, 474, 574 before exiting the control valve 100. However, any of the exemplary cages 130, 230, 330, 430, 530 may be altered for installation in a flow-down control valve. For example, FIG. 12 illustrates a flow-down control valve 600 with a sixth exemplary valve cage 630. In this example, fluid flows into the control valve 600 through the inlet 604, flows into a plurality of flow paths 674 and into a central cavity 636 of the cage 630 before exiting the control valve 600 through an outlet 606. The valve cage 630 is similar to the second exemplary valve cage 230 of FIGS. 6 and 7, and is configured to slidably receive a cylindrical or round control member 624 in the central cavity 636. However, as shown in FIG. 13, the plurality of flow paths 674 of the cage 630 are arranged specifically for a flow-down valve 600. As shown in FIG. 13, inlet and outlet flow passages 690, 692 are arranged in an opposite manner by comparison to a flow-up cage so that the inlet passages 690 extend from an exterior wall 670 of a cage body 634 and the outlet passages 692 extend from an interior wall 666 of the cage body 634.

The exemplary valve cages 130, 230, 330, 430, 530, and 630 illustrated and described herein may be manufactured additive manufacturing, which may be any additive manufacturing technique or process that builds three-dimensional objects by adding successive layers of material on a material. The pressure reduction stages of the flow paths, including the orientation and size of the inlet and outlet passages, may be customized according to application. In particular, the flow paths 174, 274, 374, 474, 574 of the flow-up cages 130, 230, 330, 430, 530 are formed in which the inlet passages are formed in the interior wall 166, 266, 366, 466, 566, 666 of the cage 130, 230, 330, 430, 530, 630 and have a greater cross-sectional area than a cross-sectional area of the outlet passages. Due to limitations of conventional drilling techniques, the configuration of the flow-up cage design may only be possible using additive manufacturing techniques.

The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

The exemplary valve cages 130, 230, 330, 430, 530, 630 described herein may substantially reduce the impact of cavitation on a control valve, which extends the useful life of valve components of a control valve or regulator. The cages 130, 230, 330, 430, 530, 630 described herein lessen the effects of cavitation in a few different ways. In one example, the cage design mitigates damage from cavitation by directing fluid jets into each other to dissipate energy. Thus, any damage due to cavitation will occur on the exterior wall 170, 270, 370, 470, 570, 670 of the cage body 134, 234, 334, 434, 534, 634 instead of more critical areas of the control valve, such as, for example, an interior wall of the valve body. In another example, the cage design avoids or lessens the impact of cavitation by providing a multiple stages of pressure reduction by differentiating the inlet and outlet passages (and intermediate passages, where applicable). Further, the cage design of the valve cages 130, 230, 330, 430, 530, 630 illustrated and described herein beneficially maximizes flow rate through the cage 130, 230, 330, 430, 530, 630 because the projections 158, 258, 358, 458, 558, 658 increase the surface area of the cage 130, 230, 330, 430, 530, 630.

Finally, although certain valve cages have been described herein in accordance with the teachings of the present disclosure, the scope of coverage of this patent is not limited thereto. On the contrary, while the disclosed valve cages have been shown and described in connection with various examples, it is apparent that certain changes and modifications, in addition to those mentioned above, may be made. This patent application covers all examples of the teachings of the disclosure that fairly fall within the scope of permissible equivalents. Accordingly, it is the intention to protect all variations and modifications that may occur to one of ordinary skill in the art.

What is claimed:

1. A flow control valve comprising: a valve body having an inlet, an outlet, and a flow path connecting the inlet and the outlet; a trim assembly disposed in the flow path and including a valve seat and a cage, the cage including a body having a central cavity, a projection extending radially outward from the central cavity, and a peripheral cavity extending within the projection; a control member movable in the central cavity of the cage between an open position, in which the control member is spaced away from the valve seat, and a closed position, in which the control member engages the valve seat; wherein the body of the cage is a unitary body and has a non-circular longitudinal cross-section.

2. The flow control valve of claim 1, wherein the body of the cage includes a plurality of projections extending radially outward from the central cavity.

3. The flow control valve of claim 1, further comprising a plurality of flow paths formed in the projection of the body of the cage, the plurality of flow paths extending between an inner wall and an outer wall of the body of the cage.

4. The flow control valve of claim 3, wherein the one or more of the plurality of flow paths are oriented substantially tangential to the central cavity of the cage.

5. The flow control valve of claim 1, wherein the projection has a U-shape cross-section with first and second arms and an elbow connecting the first and second arms.

6. The flow control valve of claim 5, further comprising a plurality of flow paths formed in one or more of the first and second arms of projection.

7. The flow control valve of claim 1, wherein the peripheral cavity is in fluid communication with the central cavity.

8. The flow control valve of claim 7, further comprising a baffle disposed in the peripheral cavity.

9. The flow control valve of claim 7, wherein the control member includes a rib extending into the peripheral cavity.

10. A cage assembly comprising:
a control member; and
a cage having a central cavity and a body defining the central cavity, the body having a non-circular longitudinal cross-section and a plurality of lobes adjacent to the central cavity;
wherein the central cavity of the cage slidably receives the control member; and
wherein the plurality of lobes extends from a top surface to a bottom surface of the body.

11. The cage assembly of claim 10, further comprising a plurality of flow paths extending through one or more lobes of the plurality of lobes.

12. The cage assembly of claim 11, wherein the plurality of flow paths are tangentially oriented relative to the central cavity.

13. The cage assembly of claim 10, further comprising a plurality of peripheral cavities in fluid communication with the central cavity, wherein each peripheral cavity of the plurality of peripheral cavities is defined by one lobe of the plurality of lobes.

14. The cage assembly of claim 13, wherein the control member includes a plurality of ribs, each rib of the plurality of ribs extending into one peripheral cavity of the plurality of peripheral cavities.

15. The cage assembly of claim 13, further comprising a baffle disposed in at least one peripheral cavity of the plurality of peripheral cavities.

16. The cage assembly of claim 10, wherein each lobe of the plurality of lobes has a U-shaped longitudinal cross-section, the U-shaped longitudinal cross-section including a first arm, a second arm, and an elbow connecting the first and second arms, and wherein a plurality of flow paths are disposed in at least one of the first and second arms of each lobe of the plurality of lobes.

17. A cage for a fluid control device, the cage comprising: a body having an interior wall, an exterior wall, and a projection; a central cavity defined by the interior wall of the body, the projection extending outwardly from the central cavity; a plurality of flow paths connecting the interior wall and the exterior wall, the plurality of flow paths tangentially disposed relative to the central cavity; wherein the body has a non-circular longitudinal cross-section; wherein the projection includes a U-shaped longitudinal cross-section including a first arm, a second arm, and an elbow connecting the first and second arms, and the plurality of flow paths are formed in the first and second arms of the projection.

18. The cage of claim 17, wherein the body includes a plurality of projections extending outwardly from the central cavity, at least one of the plurality of projections defining a peripheral cavity that is fluidly connected to the central cavity.

19. A flow control valve comprising: a valve body having an inlet, an outlet, and a flow path connecting the inlet and the outlet; a trim assembly disposed in the flow path and including a valve seat and a cage, the cage including a body and a central cavity defined by the body of the cage; a control member movable in the central cavity of the cage between an open position, in which the control member is spaced away from the valve seat, and a closed position, in which the control member engages the valve seat; wherein the body of the cage is a unitary body and has a non-circular longitudinal cross-section; wherein the body of the cage includes a plurality of projections extending radially outward from the central cavity; and wherein each projection of the plurality of projections has a U-shape cross-section with first and second arms and an elbow connecting the first and second arms.

\* \* \* \* \*

UNITED STATES PATENT AND TRADEMARK OFFICE
CERTIFICATE OF CORRECTION

| | |
|---|---|
| PATENT NO. | : 11,320,064 B2 |
| APPLICATION NO. | : 16/893072 |
| DATED | : May 3, 2022 |
| INVENTOR(S) | : Paul T. Alman |

It is certified that error appears in the above-identified patent and that said Letters Patent is hereby corrected as shown below:

In the Specification

At Column 5, Line 50, "a distance" should be -- at distance --.

At Column 8, Line 55, "in data" should be -- data --.

Signed and Sealed this
Fifth Day of September, 2023

Katherine Kelly Vidal
*Director of the United States Patent and Trademark Office*